United States Patent [19]
Kawakami et al.

[11] Patent Number: 6,001,439
[45] Date of Patent: *Dec. 14, 1999

[54] STRETCH BLOW MOLDED CONTAINER AND PRODUCTION PROCESS THEREOF

[75] Inventors: Yukichika Kawakami; Nobuo Sato; Mitsuru Hoshino; Toshitaka Kouyama, all of Fukushima; Zenya Shiiki, Chiba, all of Japan

[73] Assignee: Kureha Kagaku Kogyo K.K., Tokyo, Japan

[*] Notice: This patent is subject to a terminal disclaimer.

[21] Appl. No.: 08/846,137

[22] Filed: Apr. 25, 1997

[30] Foreign Application Priority Data

May 9, 1996 [JP] Japan ..................................... 8-139633

[51] Int. Cl.$^6$ .............................. C08K 5/10; B29D 22/00
[52] U.S. Cl. ..................... 428/35.7; 428/36.92; 428/216; 428/218; 428/220; 206/524.6; 220/DIG. 30; 524/315; 524/317
[58] Field of Search ..................................... 428/35.7, 218, 428/36.92, 216, 220; 220/DIG. 30; 206/524.6; 524/306, 315, 317

[56] References Cited

U.S. PATENT DOCUMENTS

| | | | |
|---|---|---|---|
| 2,676,945 | 4/1954 | Higgins | 260/45.7 |
| 3,442,871 | 5/1969 | Schmitt et al. | 260/78.3 |
| 4,182,841 | 1/1980 | Hauenstein | 525/437 |
| 4,424,242 | 1/1984 | Barbee | 428/35 |
| 4,565,851 | 1/1986 | Barbee | 525/437 |
| 5,403,897 | 4/1995 | Ebato et al. | 525/444 |
| 5,444,113 | 8/1995 | Sinclair et al. | 524/306 |
| 5,502,158 | 3/1996 | Sinclair et al. | 528/354 |
| 5,556,895 | 9/1996 | Lipinsky et al. | 521/182 |
| 5,688,586 | 11/1997 | Shiiki et al. | 428/121 |
| 5,703,160 | 12/1997 | Dehennau et al. | 525/54.24 |

FOREIGN PATENT DOCUMENTS

| | | |
|---|---|---|
| 6-023828 | 2/1994 | Japan . |
| 6-278785 | 10/1994 | Japan . |
| 7-172425 | 7/1995 | Japan . |

OTHER PUBLICATIONS

European Patent Office Communication, including European Search Report for EP 97 30 3144 dated Feb. 5, 1998.

*Primary Examiner*—Rena L. Dye
*Attorney, Agent, or Firm*—Dinsmore & Shohl LLP

[57] ABSTRACT

The invention provides a stretch blow molded container formed from a thermoplastic resin material which comprises polyglycolic acid having (a) a repeating unit represented by the following formula (1):

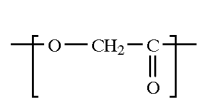

(1)

(b) a melt viscosity, $\eta^*$ [as measured at a temperature of (the melting point, Tm of the polymer+20° C.) and a shear rate of 100/sec] of 500–100,000 Pa·s;

(c) a melting point, Tm of at least 180° C.;

(d) a melt enthalpy, $\Delta Hm$ of at least 20 J/g; and (e) a density of at least 1.50 g/cm$^3$ as measured in an unoriented, crystallized form, wherein the stretch blow molded container has tensile strength (in a circumferential direction) of at least 100 MPa and a carbon dioxide permeability (as measured at a temperature of 23° C. and 80% relative humidity; in terms of the thickness of 50 $\mu$m) of 300 cc/m$^2$·day·atm or smaller at the body sidewall thereof, and a production process thereof.

18 Claims, No Drawings

STRETCH BLOW MOLDED CONTAINER AND PRODUCTION PROCESS THEREOF

FIELD OF THE INVENTION

The present invention relates to a stretch blow molded container formed from a thermoplastic resin material comprising polyglycolic acid, and more particularly to a stretch blow molded container (stretched and oriented hollow container) having excellent degradability in soil, high barrier properties (carbon dioxide barrier property and oxygen barrier property), high modulus·high strength, high heat resistance and high water vapor resistance, and a production process thereof. The stretch blow molded container according to the present invention can be used as containers for, for example, carbonated drinks, cooling drinks, seasonings, edible oils, fruit juices, alcoholic drinks, detergents and cosmetics, making good use of the above-described various properties.

BACKGROUND OF THE INVENTION

In recent years, increase in plastic waste has become a great social problem. Since many of polymeric materials have hitherto been developed and produced in search of high performance and long-term stability, they are not easily decomposed in a natural environment. Therefore, how to dispose and manage a large quantity of plastic waste which has become useless becomes a social problem on a worldwide scale. Of the plastic waste, hollow containers formed from a variety of synthetic resins, such as polyolefin resins such as polyethylene and polypropylene, polyester resins such as polyethylene terephthalate (PET), and polyvinyl chloride resins become a special problem because they are bulky.

Under the circumstances, biodegradable polymers, which are degraded by natural microorganisms, attract attention as polymeric materials which impose no burden on the environment. The biodegradability can be evaluated by, for example, a degradability test in soil (soil degradability test). Since plastic hollow containers such as PET bottles are required to have, for example, good barrier properties, toughness, heat resistance, melt processability and profitability, however, any plastic hollow container, which fully satisfies these requirements and exhibits biodegradability, has not been yet obtained.

More specifically, hollow containers making use of the conventional biodegradable plastics involve the following problems. For example, hollow containers based on starch are unsatisfactory in water resistance, barrier properties, mechanical properties, heat resistance and mildew resistance and involve a problem that such a plastic material is difficult to melt-process, so that its processing cost becomes high. Hollow containers based on cellulose are unsatisfactory in barrier properties to oxygen and carbon dioxide and mechanical properties and involve a problem that such a plastic material is difficult to melt-process, so that its processing cost becomes high. Hollow containers based on a microorganism-produced polyester are unsatisfactory in barrier properties to oxygen and carbon dioxide and mechanical strength and involve a problem that their production cost is very high. Hollow containers based on a synthetic type polyester such as a polysuccinate (Japanese Patent Application Laid-Open No. 172425/1995) are unsatisfactory in barrier properties to oxygen and carbon dioxide, mechanical strength and heat resistance and involve a problem that succinic acid and butanediol, which are raw materials for the polyester, are considerably expensive.

Hollow containers based on polylactic acid, which is a semi-synthetic type polyester, are unsatisfactory in barrier properties to oxygen and carbon dioxide and mechanical strength. Since L-lactic acid, which is an optically active substance used as a raw material, is required to have a high purity, the hollow containers must be produced through fermentation of a biological process, and there is hence a limit to their production at low cost. Further, since polylactic acid has a high glass transition temperature, Tg, it also involves a problem that it is difficult to compost under ordinary composting conditions.

Biodegradable containers making use of a lactic acid polymer have recently been proposed (Japanese Patent Application Laid-Open No. 23828/1994). As a specific example thereof, a hollow container based on a lactic acid-polyglycolic acid (weight ratio=50:50) copolymer is disclosed (Example 6). However, the copolymer containing a lactic acid component in such a great amount generally loses crystallizability and becomes an amorphous polymer having a glass transition temperature, Tg of about 30–50° C., so that the copolymer involves a problem that it is brittle, low in mechanical strength and extremely low in barrier properties to carbon dioxide and oxygen and heat resistance.

A biodegradable bottle for drippings obtained by molding polylactic acid or a copolymer of lactic acid and glycolic acid in accordance with a blow molding process has been proposed (Japanese Patent Application Laid-Open No. 278785/1994). The bottle for drippings is a small-sized hollow container generally having an internal volume of 5 ml or smaller and is used as a small-lot packaging container for edible seasonings such as soy, sauce, drippings for spitchcock and buckwheat noodle, and liquid spices. In this publication, pellets of a lactic acid-glycolic acid copolymer, which are obtained by melting an artificial fibrous cloth for a synthetic absorbent, tissue substitute ("VICRYL MESH", trade name) produced by Johnson & Johnson Medical Co. at about 200° C. in an extruder into a strand and chopping the strand are used as the copolymer of lactic acid and glycolic acid (Example 1). The lactic acid-glycolic acid copolymer used in this example has a melt viscosity as low as about 300 Pa·s (at a shear rate of 100/sec). Therefore, it is difficult to apply such a copolymer to usual extrusion blow molding to mold it due to too hard drawdown of its melt though it can be formed into small containers such as bottles for drippings. This publication describes the fact that blow molding was conducted at a resin temperature of about 175° C. Even when a parison is blow-molded at such a high resin temperature, only a substantially non-oriented, extrusion blow molded container which scarcely undergoes molecular orientation can be obtained. Such a non-oriented, extrusion blow molded container has poor barrier properties and heat resistance. Besides, such hollow containers of medium size (about 25 ml) or greater become insufficient in mechanical properties.

OBJECTS AND SUMMARY OF THE INVENTION

It is an object of the present invention to cheaply provide a plastic hollow container, which has high barrier properties to carbon dioxide and oxygen and excellent mechanical properties, heat resistance and resistance to water vapor transmission and exhibits high degradability in soil.

The present inventors have carried out an extensive investigation with a view toward overcoming the above-described problems involved in the prior art. As a result, it has been found that a stretch blow molded container formed from a thermoplastic resin material comprising polyglycolic acid having specific physical properties exhibits high degradability in soil, has high barrier properties, excellent toughness, heat resistance and resistance to water vapor transmission and sufficient physical properties to replace plastic hollow containers which have heretofore become a problem among plastic waste, and can be produced at a relatively low price.

The polyglycolic acid can be obtained, for example, by heating glycolide (i.e., a dimeric cyclic ester of glycolic acid) in the presence of a catalyst (for example, a cationic catalyst such as a tin organic carboxylate, tin halide or antimony halide), thereby subjecting it to bulk ring-opening polymerization or solution ring-opening polymerization. In order to obtain polyglycolic acid having excellent physical properties, it is preferable to use high-purity glycolide as a monomer. The high-purity glycolide can be obtained with good productivity by a process in which an oligomer of glycolic acid is mixed with a high-boiling polar organic solvent, the mixture is heated under ordinary pressure or reduced pressure to a temperature at which depolymerization of the oligomer occurs, thereby depolymerizing the oligomer in a state that the oligomer forms a solution phase, glycolide formed is distilled out together with the high-boiling polar organic solvent, and the glycolide is recovered from the distillate.

An example of a process for producing a stretch blow molded container from the polyglycolic acid includes a process in which the polyglycolic acid alone or a composition containing the polyglycolic acid is pelletized, the pellets thus obtained are charged into an injection molding machine or extruder to form a preform, and the preform is subjected to stretch blow molding. In the formation of the preform, it is important to injection-mold or extrude the polyglycolic acid or the composition thereof at a resin temperature controlled to the melting point, Tm of the polyglycolic acid to 255° C. In the blow molding, the preform is stretched at a draw ratio higher than one time but not higher than 10 times and a resin temperature of (the glass transition temperature, Tg of the polyglycolic acid+70° C.) or lower in a machine direction by means of a stretching rod or the like and simultaneously or successively blown up at a blow-up ratio of 1.5–10 into a hollow container. The thus-obtained hollow container is optionally heat set.

The polyglycolic acid can be industrially mass-produced by using extremely cheep raw materials of CO, $H_2O$ and $CH_2O$ or ethylene glycol. Since the stretch blow molded container according to the present invention has high degradability in soil, it scarcely imposes burden on the environment.

The present invention has been led to completion on the basis of these findings.

According to the present invention, there is thus provided a stretch blow molded container formed from a thermoplastic resin material which comprises polyglycolic acid having (a) a repeating unit represented by the following formula (1):

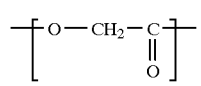

(b) a melt viscosity, η* [as measured at a temperature of (the melting point, Tm of the polymer+20° C.) and a shear rate of 100/sec] of 500–100,000 Pa·s;

(c) a melting point, Tm of at least 180° C.;
(d) a melt enthalpy, ΔHm of at least 20 J/g; and
(e) a density of at least 1.50 g/cm³ as measured in an unoriented, crystallized form,
wherein the stretch blow molded container has tensile strength (in a circumferential direction) of at least 100 MPa and a carbon dioxide permeability (as measured at a temperature of 23° C. and 80% relative humidity; in terms of the thickness of 50 μm) of 300 cc/m² day·atm or smaller at the body sidewall thereof.

According to the present invention, there is also provided a process for producing a stretch blow molded container, comprising the steps of forming or molding a thermoplastic resin material which comprises polyglycolic acid having (a) a repeating unit represented by the following formula (1):

(b) a melt viscosity, η* [as measured at a temperature of (the melting point, Tm of the polymer+20° C.) and a shear rate of 100/sec] of 500–100,000 Pa·s;

(c) a melting point, Tm of at least 180° C.;
(d) a melt enthalpy, ΔHm of at least 20 J/g; and
(e) a density of at least 1.50 g/cm³ as measured in an unoriented, crystallized form, at a resin temperature of from the melting point, Tm to 255° C. into a preform; stretching the preform at a draw ratio higher than one time but not higher than 10 times and a resin temperature of (the glass transition temperature, Tg of the polyglycolic acid+70° C.) or lower in a machine direction; simultaneously or successively blowing up the preform at a blow-up ratio of 1.5–10 into a hollow container; and optionally heat setting the thus-obtained hollow container for 1 second to 30 minutes at a temperature ranging from the crystallization temperature, $Tc_1$ of the polyglycolic acid to (Tm+10° C.).

Among the stretch blow molded containers according to the present invention, a stretch blow molded container having a carbon dioxide permeability (as measured at a temperature of 23° C. and 80% relative humidity; in terms of the thickness of 50 μm) of 300 cc/m²·day·atm or smaller and an oxygen permeability (as measured at a temperature of 23° C. and 80% relative humidity; in terms of the thickness of 50 μm) of 150 cc/m2·day·atm or smaller and/or a water vapor permeability (as measured at a temperature of 40° C. and 90% relative humidity; in terms of the thickness of 50 μm) of 100 g/m²·day or smaller at the body sidewall thereof may replace the conventional hollow containers such as polyester hollow containers, polyvinyl chloride hollow containers, multi-layer polyamide hollow containers and multi-layer ethylene-vinyl alcohol copolymer hollow containers and may be suitable for use as containers for, for example, carbonated drinks, alcoholic drinks, cooling drinks, seasonings and edible oils.

Among the stretch blow molded containers according to the present invention, a stretch blow molded container having a heat shrinkage (as measured at 130° C. for 10 minutes) of at most 30% at the body sidewall thereof may replace the conventional hollow containers of which high heat resistance is required.

Among the stretch blow molded containers according to the present invention, a stretch blow molded container having a tensile modulus (in a circumferential direction) of at least 3.0 GPa at the body sidewall thereof may be provided as a hollow container reduced in weight per unit area, thereby permitting the provision of a low-cost container. Since the conventional hollow containers formed of a lactic acid polymer use L-lactic acid, which is a high-purity, optically active substance obtained by fermentation of a biological process, there is a limit to reduction in cost even if they are mass-produced. On the other hand, the polyglycolic acid used in the present invention uses glycolide which can be mass-produced as a high-purity product by "a solution-phase depolymerization process" (Japanese Patent Application No. 48000/1996) developed by the present inventors without using any biological process, and so low-cost production is feasible.

DETAILED DESCRIPTION OF PREFERRED EMBODIMENTS

The present invention will hereinafter be described in detail.

Structure of Polymer

The polyglycolic acid useful in the practice of the present invention is a polymer having a repeating unit represented by the following formula (1):

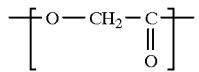
(1)

The proportion of the repeating unit represented by the formula (1) in the polymer is generally at least 70 wt. %, preferably at least 80 wt. %, more preferably 90 wt. %. If the proportion of the repeating unit represented by the formula (1) is lower than 70 wt. %, there is a possibility that the crystallizability inherent in the polyglycolic acid may be impaired, and so the barrier properties to oxygen and carbon dioxide, tensile strength, tensile modulus and resistance to heat shrinkage of the resulting stretch blow molded container may be markedly deteriorated.

As examples of other repeating units than the repeating unit represented by the formula (1), may be mentioned a repeating unit represented by the following formula (2):

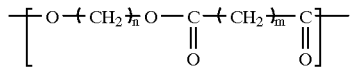
(2)

wherein n is 1–10, and m is 0–10, a repeating unit represented by the following formula (3):

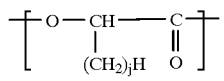
(3)

wherein j is 1–10, a repeating unit represented by the following formula (4):

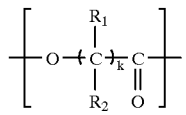
(4)

wherein $R_1$ and $R_2$ are independently a hydrogen atom or an alkyl group having 1–10 carbon atoms, and k is 2–10, a repeating unit represented by the following formula (5):

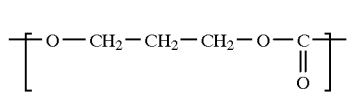
(5)

and a repeating unit represented by the following formula (6):

(6)

When these repeating units are introduced in a proportion of at least 1 wt. %, the melting point, Tm of the glycolic acid homopolymer can be lowered. When the melting point, Tm can be lowered, the processing temperature of the polymer can be lowered, whereby thermal decomposition upon melt processing can be reduced. 20 Besides, the crystallization rate of the polyglycolic acid can also be controlled by the copolymerization to improve its extrudability and stretchability. On the other hand, if the proportion of these repeating units (2) to (6) exceeds 30 wt. %, there is a possibility that 25 the crystallizability inherent in the polyglycolic acid may be impaired.

Physical Properties of Polymer

<Molecular weight—melt viscosity>

The polyglycolic acid used as a raw material for he stretch blow molded container according to the present invention is a high-molecular weight polymer. The melt viscosity of the polymer can be used as an index to its molecular weight. The polyglycolic acid used in the present invention has a melt viscosity, $\eta^*$ of 500–100,000 Pa·s, preferably 1,000–50,000 Pa·s, more preferably 1,500–20,000 Pa·s as measured at a temperature of (Tm+20° C.) (i.e., a temperature corresponding to a usual melt-processing temperature) and a shear rate of 100/sec.

If the melt viscosity, $\eta^*$ of the polyglycolic acid is lower than 500 Pa·s, there is a possibility that a melt of the polymer may undergo drawdown, difficulties may be encountered upon stretching and orientation, or its degree of crystallinity may be lowered when the polymer is melt-molded into a stretch blow molded container, or the resulting stretch blow molded container may become insufficient in mechanical strength and hence liable to be broken. If the melt viscosity, $\eta^*$ of the polyglycolic acid exceeds 100,000 Pa·s on the other hand, its melt processing requires a higher temperature, and there is a possibility that the polyglycolic acid may undergo heat deterioration upon the processing at that temperature.

<Thermal Properties>

The melting point, Tm of the polyglycolic acid useful in the practice of the present invention is at least 180° C., preferably at least 200° C., more preferably at least 210° C. The use of the polyglycolic acid having a higher Tm permits the provision of a stretch blow molded container having excellent barrier properties, mechanical properties and heat resistance. The melt enthalpy, $\Delta Hm$ of the polyglycolic acid used in the present invention is at least 20 J/g, preferably at least 30 J/g, more preferably at least 40 J/g.

Polyglycolic acid having a Tm lower than 180° C. and/or a ΔHm smaller than 20 J/g is considered to be such that its degree of crystallinity is lowered due to the disorder of its intramolecular chemical structure, and consequently the Tm and/or ΔHm may be lowered. Accordingly, a stretch blow molded container formed from such a polyglycolic acid has a possibility that the barrier properties may be lowered, or the tensile strength and tensile modulus may be insufficient, and the heat resistance may also be insufficient. The melt crystallization enthalpy, ΔHmc of the polyglycolic acid used in the present invention is preferably at least 10 J/g, more preferably at least 20 J/g, most preferably at least 30 J/g.

<Density>

The polyglycolic acid used in the present invention has a density of at least 1.50 g/cm$^3$, preferably 1.51 g/cm$^3$, more preferably 1.52 g/cm$^3$ as measured in an unoriented, crystallized form. Polyglycolic acid having density lower than 1.50 g/cm$^3$ is considered to be such that its degree of crystallinity is lowered due to the disorder of its intramolecular chemical structure, and consequently the density may be lowered. Accordingly, a stretch blow molded container formed from such a low-density polyglycolic acid has a possibility that the degree of crystallinity may be low, and the barrier properties, tensile strength, tensile modulus and heat resistance may be insufficient.

General Properties of Stretch Blow Molded Container

<Degradability in Soil>

The stretch blow molded container according to the present invention is a soil-degradable molded product which scarcely imposes burden on the environment. More specifically, when the stretch blow molded container formed of the polyglycolic acid according to the present invention is buried at the depth of 10 cm under the ground, it is degraded within generally 24 months, preferably 12 months to lose its original form. For example, the conventional hollow containers formed of polylactic acid involve a problem that since the glass transition temperature, Tg of polylactic acid is too high, it is difficult to compost the hollow containers under ordinary conditions. On the other hand, the stretch blow molded container according to the present invention is formed from the polyglycolic acid the Tg of which is not very high, so that it is possible to compost it under ordinary conditions.

<Transparency>

The stretch blow molded container according to the present invention is substantially colorless and has high transparency and an extremely low haze when an inorganic filler is not added or added in only a small amount.

<Tensile Strength>

The stretch blow molded container according to the present invention requires that the molecular chain of the polymer at the body sidewall thereof be sufficiently oriented by stretching upon the stretch blow molding. If the orientation of the molecular chain by stretching is insufficient, the degree of crystallinity of the polymer becomes low upon the stretch blow molding, so that harmful coarse spherulites are formed, and the resulting stretch blow molded container insufficiently develops barrier properties, mechanical properties and heat resistance.

The tensile strength value of the stretch blow molded container at the body sidewall thereof can be used as an index to the degree of stretching and orientation of the stretch blow molded container. According to the present invention, a stretch blow molded container having an internal volume of generally at least about 25 ml, preferably at least about 50 ml can be obtained. The stretch blow molded container according to the present invention has tensile strength of at least 100 MPa, preferably 150 MPa, more preferably 200 MPa in a circumferential direction (transverse direction) at the body sidewall thereof and hence has a high degree of orientation. If the tensile strength is lower than 100 MPa, the orientation of the molecular chain in the stretch blow molded container becomes insufficient, and so its barrier properties, toughness and heat resistance become insufficient.

In order to obtain a stretch blow molded container having tensile strength (in a circumferential direction) of at least 100 MPa at the body sidewall thereof, it is preferable to blow up a preform formed from the thermoplastic resin material comprising the polyglycolic acid at a resin temperature of (Tg+70° C.) or lower to stretch and orient the preform in such a manner that a blow-up ratio (a ratio of the diameter of the resulting container to the diameter of the preform) is at least 1.5. If the resin temperature exceeds (Tg+70° C.), the motion of the molecular chain in the polymer becomes too hard, and there is hence a possibility that a state of orientation by stretching may be immediately relaxed even when stretch blow molding is conducted, and so the orientation may be extinguished or reduced to a great extent. The blow-up ratio is generally 1.5–10, preferably 1.8–9, more preferably 2.0–8. If the blow-up ratio is lower than 1.5, the orientation of the molecular chain becomes insufficient, so that there is a possibility that the degree of crystallinity of the polymer may be insufficient, and the formation of harmful coarse spherulites may hence be brought, resulting in a stretch blow molded container which cannot exhibit sufficient tensile strength and also has insufficient barrier properties, heat resistance and transparency.

<Barrier Properties>

According to the present invention, there can be provided a stretch blow molded container having high oxygen and carbon dioxide barrier properties. The stretch blow molded container according to the present invention has an oxygen permeability (as measured at a temperature of 23° C. and 80% relative humidity; in terms of the thickness of 50 μm) of generally 150 cc/m$^2$·day·atm or smaller, preferably 50 cc/m$^2$·day·atm or smaller, more preferably 20 cc/m$^2$·day·atm or smaller at the body sidewall thereof. The stretch blow molded container according to the present invention has a carbon dioxide permeability (as measured at a temperature of 23° C. and 80% relative humidity; in terms of the thickness of 50 μm) of generally 300 cc/m$^2$·day·atm or smaller, preferably 100 cc/m$^2$·day·atm or smaller, more preferably 30 cc/m$^2$·day·atm or smaller at the body sidewall thereof. As described above, the present invention can provide a stretch blow molded container having high barrier properties to oxygen and carbon dioxide. The stretch blow molded container according to the present invention has good water vapor resistance as demonstrated by its water vapor permeability (as measured at a temperature of 40° C. and 90% relative humidity; in terms of the thickness of 50 μm) of generally 100 g/m$^2$·day or smaller, preferably 50 g/m$^2$·day or smaller, more preferably 30 g/m$^2$·day or smaller at the body sidewall thereof.

The hollow container having such high barrier properties is unrivaled in the conventional soil-degradable hollow containers and belongs to hollow containers having extremely high barrier properties compared with the conventional high-barrier plastic hollow containers (for example, polyester hollow containers, multi-layer extruded polyamide hollow containers, polyvinylidene chloride hollow containers and multi-layer extruded ethylene-vinyl alcohol copolymer hollow containers) which have become a problem among the plastic waste.

The stretch blow molded container according to the present invention retains the high barrier properties even under high-humidity conditions of 80–90% relative humidity (RH). Such barrier properties are unexpectable. The stretch blow molded container according to the present invention can replace general-purpose barrier hollow containers such as PET bottles as containers for, for example, carbonated drinks, cooling drinks, seasonings, edible oils, alcoholic drinks and fruit juices as it is or by further providing a water-vaporproof coating or a water-vaporproof laminate layer thereon.

<Tensile Modulus>

The stretch blow molded container according to the present invention has high modulus as demonstrated by its tensile modulus (in a circumferential direction) of at least 3.0 GPa, preferably at least 3.5 GPa, more preferably at least 4.0 GPa at the body sidewall thereof. Since the body sidewall of the stretch blow molded container according to the present invention is high in modulus, its stiffness remains high even when its wall thickness is reduced to about a half of that of the conventional hollow containers, so that the container is hard to be deformed even when it is filled with contents. Accordingly, the reduction in wall thickness by virtue of this high modulus brings about an extremely great economical effect.

<Heat Shrinkage>

According to the present invention, there can be provided a stretch blow molded container having excellent heat resistance. The heat shrinkage (as measured at 130° C. for 10 minutes) of the stretch blow molded container according to the present invention at the body sidewall thereof is as low as generally at most 30%, preferably at most 20%, more preferably at most 10%. The hollow container having such a low heat shrinkage is suitable for use as a container for food such as seasonings, of which high-temperature sterilization is required. Any hollow container having a heat shrinkage exceeding 30% generally undergoes too great deformation when used at a high temperature of 130° C. or higher, so that problems may be encountered in some cases.

Production Process of Stretch Blow Molded Container

<Raw Polymer>

The polyglycolic acid used as a raw material of the stretch blow molded containers according to the present invention can be prepared by the following processes.

(1) The polyglycolic acid can be obtained by a process in which glycolide (i.e., 1,4-dioxane-2,5-dione) is heated to a temperature of about 120–250° C. in the presence of a small amount of a catalyst (for example, a cationic catalyst such as a tin organic carboxylate, tin halide or antimony halide), thereby subjecting it to ring-opening polymerization. The ring-opening polymerization is preferably conducted by a bulk polymerization process or solution polymerization process.

(2) The polyglycolic acid can be obtained by a polycondensation process wherein glycolic acid or an alkyl glycolate is heated in the presence or absence of a catalyst, thereby subjecting it to dehydration or dealcoholization.

In order to obtain a glycolic acid copolymer, it is only necessary to copolymerize glycolide, glycolic acid or an alkyl glycolate in accordance with the above process (1) or (2) in suitable combination with, as a comonomer, for example, a cyclic monomer such as ethylene oxalate (i.e., 1,4-dioxane-2,3-dione), lactide, a lactone (for example, β-propiolactone, β-butyrolactone, pivalolactone, γ-butyrolactone, δ-valerolactone, β-methyl-δ-valerolactone or ε-caprolactone), trimethylene carbonate or 1,3-dioxane; a hydroxycarboxylic acid such as lactic acid, 3-hydroxypropanoic acid, 3-hydroxy-butanoic acid, 4-hydroxybutanoic acid or 6-hydroxycaproic acid or an alkyl ester thereof; a substantially equimolar mixture of an aliphatic diol such as ethylene glycol or 1,4-butanediol and an aliphatic dicarboxylic acid such as succinic acid or adipic acid or an alkyl ester thereof; or two or more compounds thereof. The glycolic acid copolymer may be that obtained by subjecting the polyglycolic acid and another polymer having repeating units selected from among the formulae (2) to (5) to transesterification under heat. Of the above preparation processes, the process (1) is preferred because a higher-molecular weight polyglycolic acid is obtained.

As the glycolide (a dimeric cyclic ester of glycolic acid) used as a monomer in the process (1), glycolide obtained by "a solution-phase depolymerization process" (Japanese Patent Application No. 48000/1996) developed by the present inventors is preferred to that obtained by the conventional sublimation depolymerization process of a glycolic acid oligomer because a high-purity product can be mass-produced at a higher yield. The use of high-purity glycolide as a monomer permits the easy provision of high-molecular weight polyglycolic acid. The solution-phase depolymerization process is performed by (1) heating a mixture containing a glycolic acid oligomer and at least one high-boiling polar organic solvent having a boiling point within a range of 230–450° C. to a temperature, at which the depolymerization of the oligomer takes place, under ordinary pressure or under reduced pressure; (2) dissolving the oligomer in the solvent until a residual rate (volume ratio) of a melt phase of the oligomer reaches 0.5 or lower; (3) further continuing the heating at the same temperature to depolymerize the oligomer; (4) distilling out a dimeric cyclic ester (i.e., glycolide) formed together with the high-boiling polar organic solvent; and (5) recovering glycolide from the distillate.

Examples of the high-boiling polar organic solvent include aromatic carboxylic acid esters, such as bis(alkoxyalkyl) phthalates such as di(2-methoxyethyl) phthalate, alkylene glycol dibenzoates such as diethylene glycol dibenzoate, benzylbutyl phthalate, and dibutyl phthalate; and aromatic phosphoric acid esters such as tricresyl phosphate. The high-boiling polar organic solvent is used in a proportion of generally 0.3–50 times (weight ratio) to the oligomer. Polypropylene glycol, polyethylene glycol, tetraethylene glycol or the like may be used as a solubilizing agent for the oligomer in combination with the high-boiling polar organic solvent as needed. The depolymerization of the glycolic acid oligomer is generally conducted at 230° C. or higher, preferably 230–320° C. Although the depolymerization is performed under atmospheric pressure or reduced pressure, it is preferable to heat the oligomer under reduced pressure of 0.1–90.0 kPa (1–900 mbar) to depolymerize it.

<Thermoplastic Resin Material>

In the present invention, the thermoplastic resin material comprising the specific polyglycolic acid described above is used as a raw material for the stretch blow molded containers. A neat resin of the polyglycolic acid can be used as the thermoplastic resin material by itself. A composition obtained by incorporating inorganic fillers, other thermoplastic resins, plasticizers and the like into the polyglycolic acid within limits not impeding the object of the present invention may also be used as the thermoplastic resin material. More specifically, there may be used a composition (compound) obtained by incorporating the inorganic fillers, other thermoplastic resins and plasticizers in proportions of 0–100 parts by weight, 0–100 parts by weight and 0–100 parts by weight, respectively, per 100 parts by weight of the polyglycolic acid. If the inorganic fillers, other thermoplastic resins or plasticizers are used in a proportion exceeding 100 parts by weight, there is a possible problem that the barrier properties, tensile strength, tensile modulus and resistance to heat shrinkage of the resulting stretch blow molded container may become insufficient, or the melt processability of the composition may be deteriorated.

Examples of the inorganic fillers include powders, whiskers and fibers of inorganic materials such as alumina, silica, silica-alumina, zirconia, titanium oxide, iron oxide, boron oxide, calcium carbonate, calcium silicate, calcium phosphate, calcium sulfate, magnesium carbonate, magnesium silicate, magnesium phosphate, magnesium sulfate, kaolin, talc, mica, ferrite, carbon, silicon, silicon nitride, molybdenum disulfide, glass and potassium titanate. These inorganic fillers may be used either singly or in any combination thereof. Although the inorganic fillers are generally used in a proportion of 0–100 parts by weight per 100 parts by weight of the polyglycolic acid, it is desirable to use them within a range of preferably not higher than 10 parts by weight, more preferably not higher than 5 parts by weight taking barrier properties and mechanical strength into consideration. The lower limit of the inorganic fillers if incorporated is preferably 0.01 part by weight, more preferably 0.05 part by weight.

Examples of the other thermoplastic resins include a homopolymer and copolymers of lactic acid, a homopolymer and copolymers of ethylene oxalate, a homopolymer and copolymers of ε-caprolactone, polysuccinates, polyhydroxybutanoic acid, hydroxybutanoic acid-hydroxyvaleric acid copolymers, cellulose acetate, polyvinyl alcohol, starch, polyglutamates, natural rubber, polyethylene, polypropylene, styrene-butadiene copolymer rubber, acrylonitrile-butadiene copolymer rubber, polymethyl methacrylate, polystyrene, styrene-butadiene-styrene block copolymers, styrene-ethylene·butylene-styrene block copolymers, ABS resins, MBS resins and ethylene-vinyl alcohol copolymers. These thermoplastic resins may be used either singly or in any combination thereof. Although these thermoplastic resins are generally used in a proportion of 0–100 parts by weight per 100 parts by weight of the polyglycolic acid, it is desirable to use them in a proportion of preferably at most 50 parts by weight, more preferably at most 30 parts by weight taking barrier properties, mechanical strength, heat resistance and degradability in soil into consideration. The lower limit of the other thermoplastic resins if incorporated is preferably 0.01 part by weight, more preferably 0.05 part by weight.

Examples of the plasticizers include phthalates such as di(methoxyethyl) phthalate, dioctyl phthalate, diethyl phthalate and benzylbutyl phthalate; benzoates such as diethylene glycol dibenzoate and ethylene glycol dibenzoate; aliphatic dibasic acid esters such as octyl adipate and octyl sebacate; aliphatic tribasic acid esters such as tributyl acetylcitrate; phosphates such as dioctyl phosphate and tricresyl phosphate; epoxy plasticizers such as epoxidized soybean oil; and polyalkylene glycol esters such as polyethylene glycol sebacate and polypropylene glycol laurate. These plasticizers may be used either singly or in any combination thereof. Although the plasticizers are generally used in a proportion of 0–100 parts by weight per 100 parts by weight of the polyglycolic acid, it is desirable to use them in a proportion of preferably at most 50 parts by weight, more preferably at most 30 parts by weight taking barrier properties, mechanical strength and heat resistance into consideration. The lower limit of the plasticizers if incorporated is preferably 0.01 part by weight, more preferably 0.05 part by weight.

In the present invention, various additives such as heat stabilizers, light stabilizers, moistureproofing agents, waterproofing agents, water repellents, lubricants, releasing agents, coupling agents, pigments and dyes may be contained in the thermoplastic resin material as needed. These various additives are used in an effective amount as necessary for the end application intended.

The composition is prepared by a method known per se in the art by feeding the polyglycolic acid and optionally at least one of the other components such as the inorganic fillers, thermoplastic resins, plasticizers and various additives into a kneading extruder to melt and knead them at a cylinder temperature of from Tm to 255° C. (generally, 150–255° C.), extruding them into a strand, and cooling and chopping the strand into pellets.

<Production of Stretch Blow Molded Container>

The stretch blow molded container according to the present invention can be produced by forming or molding a neat resin of the polyglycolic acid having the specific properties or a composition comprising the polyglycolic acid at a resin temperature of from the melting point, Tm of the polyglycolic acid to 255° C. into a substantially amorphous preform; stretching the preform at a draw ratio higher than one time but not higher than 10 times and a resin temperature of (the glass transition temperature, Tg of the polyglycolic acid+70° C.) or lower in a machine direction; simultaneously or successively blowing up the preform at a blow-up ratio of 1.5–10 into a hollow container; and optionally heat setting the thus-obtained hollow container for 1 second to 30 minutes at a temperature ranging from the crystallization temperature, $Tc_1$ of the polyglycolic acid to (Tm+10° C.).

The resin temperature upon the formation of the preform (parison) is within a range of from the melting point, Tm to 255° C. Although the melting point, Tm of the polyglycolic acid is about 220° C. when the polymer is a homopolymer, it generally becomes lower than that temperature when the polymer is a copolymer with a comonomer such as ethylene oxalate, lactide, lactone, trimethylene carbonate or 1,3-dioxane. Therefore, the resin temperature upon the formation of the preform is controlled to generally 150–255° C., preferably 190–250° C., more preferably 200–245° C. If the resin temperature exceeds 255° C., the polyglycolic acid becomes liable to undergo thermal decomposition, resulting in a failure to provide a satisfactory preform. The preform is formed in a substantially amorphous state. When the preform is in a crystalline state, tension upon the stretching in the subsequent stretching step becomes greater, resulting in difficulty of stretching. The preform in the substantially amorphous state can be obtained by quenching a molten resin.

The temperature conditions for the stretch blow molding are (Tg+70° C.) or lower. If the resin temperature upon the stretch blow molding exceeds (Tg+70° C.), the motion of the molecular chain in the polymer becomes too hard, and there is hence a possibility that a state of orientation by stretching may be immediately relaxed even when stretch blow molding is conducted, and so the orientation may be extinguished or reduced to a great extent. In the case of a cold parison method, a parison obtained by injection molding or extrusion is cooled once to solidify it, and then reheated so as to give a resin temperature ranging from Tg to (Tg+70° C.) at the time of stretch blow molding. In the case of a hot parison method, a parison obtained by injection molding or extrusion is cooled and subjected to stretch blow molding before the resin is solidified. More specifically, when the preform is a hot parison, the preform is melt formed or molded at a temperature of from Tm to 255° C. and then quenched to a temperature of from (Tg–30° C.) to (Tg+70° C.). The thus-quenched preform is subjected to stretch blow molding before the resin is solidified. Even when the preform obtained by the melt forming or molding is quenched to supercool it to a temperature lower than Tg, it is possible to produce a stretch blow molded container so far as such a preform is immediately subjected to stretch blow molding before the resin is solidified. Although the glass transition temperature, Tg of the polyglycolic acid is about 38° C. when the polymer is a homopolymer, it varies when the polymer is a copolymer with a comonomer such as ethylene oxalate, lactide, lactone, trimethylene carbonate or 1,3-dioxane. Therefore, the resin temperature upon the stretch blow molding is controlled to (Tg+70° C.) or lower, preferably 30–100° C., more preferably 35–90° C.

The preform is stretched at a draw ratio higher than one time but not higher than 10 times in a machine direction. In the case of a closed-end parison, the stretching is generally conducted by means of a stretching rod. In the case of a parison in the form of a hollow pipe, both ends thereof are held by holders to stretch it in a longitudinal direction (machine direction). The draw ratio in the machine direction is preferably about 1.5–5 times.

The blow-up ratio is generally 1.5–10, preferably 1.8–9, more preferably 2.0–8. If the blow-up ratio is lower than 1.5, the orientation of the molecular chain becomes insufficient, so that there is a possibility that the degree of crystallinity of the polymer may be insufficient, and the formation of harmful coarse spherulites may hence be brought, resulting in a stretch blow molded container which cannot exhibit sufficient tensile strength and also has insufficient barrier properties, heat resistance and transparency. The blow-up ratio as used herein means a ratio of the diameter (maximum diameter) of the resulting container to the diameter of the parison to be formed into the container in the blow molding. The step of blowing up the parison is conducted simultaneously with or subsequently (in succession) to the stretching in the machine direction.

In the final step of the stretch blow molding, the resulting container is optionally heat set for 1 second to 30 minutes (generally, 2 seconds to 10 minutes) at a temperature ranging from the crystallization temperature, $Tc_1$ of the polyglycolic acid to (Tm+10° C.) (generally, 70–240° C.).

According to the stretch blow molding, there can be provided a stretch blow molded container which has been sufficiently stretched and oriented at the body sidewall thereof and has high barrier properties, high modulus·high strength and high heat resistance. On the other hand, according to the conventional usual extrusion blow molding (for example, Japanese Patent Application Laid-Open No. 278785/1994) or injection blow molding, in which stretching or orientation is not conducted, the stretching or orientation of a body sidewall is scarcely or insufficiently caused upon the molding of a hollow container. Therefore, the barrier properties, mechanical properties and heat resistance of the resulting hollow container become unsatisfactory.

Stretch blow molding processes usable in the present invention include the following various processes in more detail.

(1) Two-Stage Injection·Stretch Blow Molding Process

After the thermoplastic resin material comprising the polyglycolic acid is fed to an injection molding machine, and injected into a mold at a resin temperature of from Tm to 255° C. to form a closed-end parison, the parison is cooled to solidify it into a preform formed of a cold parison having a resin temperature lower than Tg. After the preform is then reheated to a resin temperature of from Tg to (Tg+70° C.), it is transferred to a mold for blow molding to stretch it at a draw ratio higher than one time but not higher than 10 times in a machine direction by a stretching rod and to simultaneously or successively blow up the preform at a blow-up ratio of 5 1.5–10 into a hollow container. The thus-obtained hollow container is optionally heat set.

(2) One-Stage Injection·Stretch Blow Molding Process

After the thermoplastic resin material comprising the polyglycolic acid is fed to an injection molding machine, and injected into a mold at a resin temperature of from Tm to 255° C. to form a closed-end parison, the parison is cooled into a preform formed of an unsolidified hot parison having a resin temperature of (Tg+70° C.) or lower. The preform is then transferred to a mold for blow molding to stretch it at a draw ratio higher than one time but not higher than 10 times in a machine direction by a stretching rod and to simultaneously or successively blow up the preform at a blow-up ratio of 1.5–10 into a hollow container. The thus-obtained hollow container is optionally heat set. In this process, the preform is transferred to the blow molding step in a state that the preform retains the remaining heat in the injection molding. A temperature control step for the hot parison may be added.

(3) Two-Stage Extrusion·Stretch Blow Molding Process (1)

After the thermoplastic resin material comprising the polyglycolic acid is fed to an extruder equipped with a parison die, and extruded at a resin temperature of from Tm to 255° C. to form a hollow pipe, the pipe is cooled to a temperature lower than Tg to solidify it, and chopped into constant lengths to provide a preform formed of a cold parison. After the preform is then reheated to a resin temperature of from Tg to (Tg+70° C.), both ends of the preform are held by holders to stretch it at a draw ratio higher than one time but not higher than 10 times in a longitudinal direction. After one end of the thus-stretched preform is then pinched off to form a closed-end parison, the parison is transferred to a mold for blow molding to blow up it at a blow-up ratio of 1.5–10 into a hollow container. The thus-obtained hollow container is optionally heat set.

(4) Two-Stage Extrusion·Stretch Blow Molding Process (2)

After the thermoplastic resin material comprising the polyglycolic acid is fed to an extruder equipped with a parison die, and extruded at a resin temperature of from Tm to 255° C. to form a hollow pipe, the pipe is cooled to a temperature lower than Tg to solidify it, and chopped into constant lengths to provide a preform formed of a cold parison. After the preform is then reheated to a resin temperature of from Tg to (Tg+70° C.), one end of the preform is pinched off to form a closed-end parison. The parison is transferred to a mold for blow molding to stretch it at a draw ratio higher than one time but not higher than 10 times in a machine direction by a stretching rod and to simultaneously or successively blow up it at a blow-up ratio of 1.5–10 into a hollow container. The thus-obtained hollow container is optionally heat set.

(5) One-Stage Extrusion·Stretch Blow Molding Process (1)

After the thermoplastic resin material comprising the polyglycolic acid is fed to an extruder equipped with a parison die, and extruded at a resin temperature of from Tm to 255° C. to form a hollow pipe, the pipe is cooled to a resin temperature of (Tg+70° C.) or lower, and chopped into constant lengths to provide a preform formed of a hot parison. Both ends of the preform are then held by holders to stretch it at a draw ratio higher than one time but not higher than 10 times in a longitudinal direction. After one end of the thus-stretched preform is then pinched off to form a closed-end parison, the parison is transferred to a mold for blow molding to blow up it at a blow-up ratio of 1.5–10 into a hollow container. The thus-obtained hollow container is optionally heat set. A temperature control step for the hot parison may be added.

(6) One-Stage Extrusion·Stretch Blow Molding Process (2)

After the thermoplastic resin material comprising the polyglycolic acid is fed to an extruder equipped with a parison die, and extruded at a resin temperature of from Tm to 255° C. to form a hollow pipe, the pipe is cooled to a resin temperature of (Tg+70° C.) or lower, and chopped into constant lengths to provide a preform formed of a hot parison. One end of the preform is then pinched off to form a closed-end parison. The parison is then transferred to a mold for blow molding to stretch it at a draw ratio higher than one time but not higher than 10 times in a machine direction by a stretching rod and to simultaneously or successively blow up it at a blow-up ratio of 1.5–10 into a hollow container. The thus-obtained hollow container is optionally heat set. A temperature control step for the hot parison may be added.

<Shape and the like of Container>

According to the present invention, there can be provided stretch blow molded containers having an internal volume of at least 25 ml. The internal volume can be suitably determined as necessary for the end application intended. A stretch blow molded container whose neck and bottom are generally formed at the time of stretch blow molding is preferably of a shape having a flat part at the bottom thereof in order that it may stand upright for itself. However, even a container having no flat part at the bottom, such as a round-bottom container, may be caused to stand upright by providing an annular belt (a sort of stand).

Application Fields

The stretch blow molded containers according to the present invention can be used in a wide variety of fields making good use of their features of high barrier properties, high modulus·high strength, high heat resistance and high transparency. Application fields of the stretch blow molded containers making good use of their high barrier properties include, for example, containers for carbonated drinks, cooling drinks, edible oils, fruit juices and alcoholic drinks. Application fields of the stretch blow molded containers making good use of their high modulus·high strength include, for example, containers for potable water, detergents and cosmetics. Application fields of the stretch blow molded containers making good use of their high heat resistance include, for example, containers for seasonings and nursing bottles, of which high-temperature sterilization is required.

Advantages of the Invention

According to the present invention, there can be provided stretch blow molded containers, which are soil-degradable and have high barrier properties to oxygen and carbon dioxide, and excellent mechanical strength, heat resistance and water vapor resistance. The stretch blow molded containers according to the present invention have sufficient physical properties to replace plastic hollow containers such as PET bottles which have heretofore become a problem among plastic waste, and are provided at relatively low prices. The stretch blow molded containers according to the present invention can be used in a wide variety of fields making good use of these excellent properties, for example, as containers for carbonated drinks, cooling drinks, edible oils, fruit juices and alcoholic drinks, containers for potable water, detergents and cosmetics, and containers for seasonings and nursing bottles, of which high-temperature sterilization is required.

Embodiments of the Invention

The present invention will hereinafter be described more specifically by the following Synthesis Example, Polymer Preparation Examples, Examples and Comparative Examples.

Measuring Methods of Physical Properties (1) Melt Viscosity, $\eta^*$

As indices to the molecular weights of polymers, their melt viscosities, $\eta^*$ were measured. A crystallized sheet obtained by heating an amorphous sheet about 0.2 mm thick of each polymer at about 150° C. for 5 minutes was used as a sample, and the melt viscosity of the sample was measured at a temperature of (Tm+20° C.) and a shear rate of 100/sec by means of a "Capirograph" (trade name, manufactured by Toyo Seiki Seisakusho, Ltd.) equipped with a nozzle having a diameter (D) of 0.5 mm and a length (L) of 5 mm.

(2) Thermal Properties

An amorphous sheet about 0.2 mm thick of each polymer was used as a sample and heated by means of a differential scanning calorimeter (DSC; TC-10A Model, manufactured by METTLER INSTRUMENT AG) at a rate of 10° C./min under a nitrogen gas stream, thereby measuring the crystallization temperature ($Tc_1$), melting point (Tm) and melt enthalpy ($\Delta Hm$) of the sample. The sample is then cooled at a rate of 10° C./min from 250° C., thereby measuring the melt crystallization temperature (Tmc) and melt crystallization enthalpy ($\Delta Hmc$) of the sample in the course of the cooling. Incidentally, the glass transition temperature (Tg) was measured at a heating rate of 5° C./min.

(3) Density of Unoriented, Crystallized Product

A sheet obtained by heat-setting an amorphous sheet about 0.2 mm thick of each polymer at about 150° C. for 5 minutes was used as a sample, and the density of the sample was measured in accordance with JIS R 7222 (a pycnometer method making use of n-butanol).

(4) Tensile Modulus

Using a TENSILON (trade name, manufactured by Toyo Baldwin K.K.), a strip-like specimen 10 mm wide was held by clamps so as to give a sample length of 30 mm to measure the tensile modulus of the sample at 23° C. and a crosshead speed of 10 mm/min. The specimen was cut out of a body sidewall of each blow molded container, and its tensile modulus in a circumferential direction (transverse direction) was measured.

(5) Tensile Strength

The tensile strength of each specimen was measured in the same manner as in the measurement of the tensile modulus except that the crosshead speed was changed to 100 mm/min.

(6) Heat Shrinkage

One end of a strip-like specimen 10 mm wide, which had been cut out of a body sidewall of each blow molded container, was held by a clip. The specimen was cut to an even length in such a manner that a free sample length was 50 mm, and suspended for 10 minutes in an air-circulating Geer's oven heated to 130° C. to heat it. Thereafter, the specimen was taken out of the Geer's oven to measure its length, thereby determining its shrinkage.

(7) Oxygen Permeability

The oxygen permeability of a sample, which has been cut out of a body sidewall of each blow molded container, was measured at 23° C. and 80% RH in accordance with JIS K 7126 by means of a double-side moistening gas permeability tester manufactured by GL Sciences Inc., and the measured value was converted into a value in a thickness of 50 μm.

(8) Carbon Dioxide Permeability

The carbon dioxide permeability of a sample, which has been cut out of a body sidewall of each blow molded container, was measured at 23° C. and 80% RH by means of the same tester as that used in the measurement of the oxygen permeability, and the measured value was converted into a value in a thickness of 50 μm.

(9) Water Vapor Permeability

The water vapor permeability of a sample, which has been cut out of a body sidewall of each blow molded container, was measured at a temperature of 40° C. and 90% RH in accordance with JIS Z 0208 by means of a PERMATRON-W3/30 manufactured by MODERN CONTROL CO., and the measured value was converted into a value in a thickness of 50 μm.

(10) Drop Test

Each blow molded container was charged with 70 ml of water and dropped from a height of 1.5 m to a concrete floor at 25° C., thereby determining whether the container was broken or not.

(11) Degradability in Soil

Strip-like specimens about 3 cm wide, which have been cut out of a body sidewall of each blow molded container, were buried at the depth of 10 cm under the ground of a plowland. The specimens were dug up at intervals of a half month to observe their shapes. The time the shape of the specimen began to deform was observed, whereby the blow container was ranked as being soil-degradable where the shape of the specimen began to degrade within 24 months after buried under ground.

[Synthesis Example 1]

Synthesis of Monomer

A 10-liter autoclave was charged with 5 kg of glycolic acid (product of Wako Pure Chemical Industries, Ltd.). While stirring, the temperature of the contents was raised from 170° C. to 200° C. over about 2 hours to heat them, whereby glycolic acid was condensed while distilling off water formed. The pressures inside the autoclave was then reduced to 19 kPa (190 mbar), and the reaction mixture was held for 2 hours under such a pressure, thereby distilling off low-boiling matter to prepare a glycolic acid oligomer. The melting point, Tm of the thus-obtained oligomer was 205° C.

A 10-liter flask was charged with 1.2 kg of the glycolic acid oligomer, and 5 kg of benzylbutyl phthalate (product of Junsei Chemical Co., Ltd.) as a solvent and 150 g of polypropylene glycol (#400, product of Junsei Chemical Co., Ltd.) as a solubilizing agent were added. The mixture was heated to 268° C. under reduced pressure of 5 kPa (50 mbar) in a nitrogen gas atmosphere to conduct "solution-phase depolymerization" of the oligomer. Glycolide formed was distilled out together with benzylbutyl phthalate.

Cyclohexane about twice as much as the distillate by volume was added to the distillate collected, whereby glycolide was crystallized from benzylbutyl phthalate and collected by filtration. The glycolide thus obtained was recrystallized from ethyl acetate and dried for two nights at room temperature under reduced pressure of about 1 kPa, thereby obtaining glycolide at a yield of about 78%.

[POLYMER PREPARATION EXAMPLE 1]

A PFA-made cylinder was charged with 200 g of glycolide obtained in Synthesis Example 1, and the glycolide was dried at room temperature for about 30 minutes while introducing nitrogen gas. Then, 0.04 g of $SnCl_4 \cdot 6.5H_2O$ as a catalyst was added, and the contents were held at 172° C. for 2 hours while introducing nitrogen gas therein, thereby polymerizing glycolide. After completion of the polymerization, the cylinder was cooled down to room temperature, and polyglycolic acid [Polymer (P-1)] was taken out of the cylinder. The bulk polymer thus obtained was ground into fine particles having a particle size of about 3 mm or smaller and dried overnight at about 150° C. under reduced pressure of about 0.1 kPa to remove a remaining monomer. The same process was conducted repeatedly to prepare a necessary amount of Polymer (P-1).

[POLYMER PREPARATION EXAMPLE 2]

Polymerization and post-treatment were performed in the same manner as in Polymer Preparation Example 1 except that a mixture of 196 g of glycolide and 4 g of L-(−)-lactide (product of Tokyo Kasei Kogyo Co., Ltd.) was used in place of 200 g of glycolide, thereby obtaining a glycolic acid-lactic acid copolymer [Polymer (P-2)]. The same process was conducted repeatedly to prepare a necessary amount of Polymer (P-2).

[POLYMER PREPARATION EXAMPLE 3]

L-(−)-Lactide (product of Tokyo Kasei Kogyo Co., Ltd.) was recrystallized from ethanol to purify it. A PFA-made cylinder was charged with 198 g of the purified L-(−)-lactide, and the lactide was dried at room temperature for about 30 minutes while introducing nitrogen gas. Then, 0.048 g of tin octanoate as a catalyst was added, and the contents were held at 130° C. for 15 hours while introducing nitrogen gas therein, thereby polymerizing the lactide. After completion of the polymerization, the cylinder was cooled down to room temperature, and a bulk polymer taken out of the cylinder was ground into fine particles having a particle size of about 3 mm or smaller. The fine particles were dried overnight at about 100° C. under reduced pressure of about 0.1 kPa to remove a remaining monomer, thereby obtaining polylactide [Polymer (P-C1)]. The same process was conducted repeatedly to prepare a necessary amount of Polymer (P-C1).

[POLYMER PREPARATION EXAMPLE 4]

A PFA-made cylinder was charged with 35.72 g (0.248 mol) of recrystallized L-(−)-lactide and 162.4 g (1.4 mol) of glycolide, and 17.0 ml of bis-2-methoxyethyl phthalate, 0.20 ml of a toluene solution of tin octanoate at a molar concentration of 0.33 and 0.0626 g of glycolic acid were added. After toluene was removed under high vacuum of 0.1 mmHg, and purging with nitrogen was conducted twice, the contents were heated at 180° C. for 40 minutes with stirring. The heating was further continued for 4 hours and 20 minutes to conduct polymerization. The resultant polymer was ground into fine particles having a particle size of about 3 mm or smaller. The fine particles were dried at about 25° C. for 48 hours under reduced pressure of about 0.1 kPa, thereby obtaining a glycolic acid/lactic acid copolymer [Polymer (P-C2)]. The same process was conducted repeatedly to prepare a necessary amount of Polymer (P-C2).

This Polymer (P-C2) is a product substantially equivalent to remelted pellets of a commercially available artificial fibrous cloth for a synthetic absorbent, tissue substitute ("VICRYL MESH", trade mark).

[POLYMER PREPARATION EXAMPLE 5]

A PFA-made cylinder was charged with 100 g of recrystallized L-(−)-lactide and 100 g of glycolide, and the contents were dried at room temperature for about 30 minutes while introducing nitrogen gas. Then, 0.048 g of tin octanoate as a catalyst was added, and the contents were held at 130° C. for 20 hours while introducing nitrogen gas therein, thereby polymerizing the monomers. After completion of the polymerization, a bulk polymer taken out of the cylinder was ground into fine particles having a particle size of about 3 mm or smaller, and the fine particles were dried overnight at about 50° C. under reduced pressure of about 0.1 kPa to remove remaining monomers, thereby obtaining a glycolic acid/lactic acid copolymer [Polymer (P-C3)]. The same process was conducted repeatedly to prepare a necessary amount of Polymer (P-C3). The polymer thus obtained had a glass transition temperature, Tg of about 44° C. and was a noncrystalline amorphous substance.

The physical properties of the polymers obtained in Polymer Preparation Examples 1–5 are shown in Table 1.

further introduced into the bottle to heat set the bottle at 150° C. for 10 seconds. The bottle was taken out of the mold to obtain a stretch blow molded container. The stretch blow molded container thus obtained was transparent.

[EXAMPLE 2]

Pellet (No. 2) was prepared in the same manner as in Example 1 except that a mixture obtained by adding 1.0 part by weight of dimethoxyethyl phthalate (DMEP) as a plasticizer to 100 parts by weight of Polymer (P-2) was used. A stretch blow molded container was molded in the same manner as in Example 1 except that Pellet (No. 2) was used. The stretch blow molded container thus obtained was transparent.

[EXAMPLE 3]

Pellet (No. 1) prepared in Example 1 was charged into an injection molding machine and injected into a closed-end

TABLE 1

|  |  | Polymer Preparation Example | | | | |
|---|---|---|---|---|---|---|
|  |  | 1 | 2 | 3 | 4 | 5 |
| Composition(*1) of Monomer (wt/wt) |  | GA | GA/LA = 98/2 | LA | GA/LA = 82/18 | GA/LA = 50/50 |
| Polymer code |  | P-1 | P-2 | P-C1 | P-C2 | P-C3 |
| $\eta^*$ (Pa · s) |  | 4200 | 3800 | 3200 | 300 | 2000 |
| Thermal properties | Tg (° C.) | 38 | 38 | 52 | 40 | 44 |
|  | $Tc_1$ (° C.) | 84 | 83 | 106 | 115 | — |
|  | Tm (° C.) | 220 | 219 | 175 | 198 | — |
|  | ΔHm (J/g) | 72 | 70 | 52 | 50 | — |
|  | Tmc (° C.) | 185 | 155 | 100 | — | — |
|  | ΔHmc (J/g) | 75 | 60 | 5 | 0 | — |
| Density of crystallized product (g/cm³) |  | 1.58 | 1.58 | 1.26 | 1.51 | — |
| Remarks |  | Invention Ex. | Invention Ex. | ΔHmc < 10 J/g, density < 1.50 g/cm³ | $\eta^*$ < 500 | Non-crystalline amorphous |

(*1): GA = glycolide; LA = L-lactide.

[EXAMPLE 1]

Polymer (P-1) was charged into a small twin-screw extruder equipped with a nozzle having a diameter of 3 mm under a nitrogen gas stream, and extruded into a strand at a melt temperature of about 230° C.–240° C. The strand was air-cooled and chopped to obtain Pellet (No. 1).

This Pellet (No. 1) was charged into an injection molding machine and injected into a closed-end parison mold (temperature: about 10° C.) at a resin temperature of about 235° C. to solidify it. The solidified resin was taken out of the mold, thereby premolding a preform (thickness: about 1.6 mm; outer diameter: about 1.6 cm; length: about 5 cm; spherical bottom surface) formed of a cold parison. The cold preform thus obtained was preheated to about 45° C. to soften it, and a stretching rod was inserted into the preform to stretch the preform about 2.25 times in a machine direction, thereby orienting it. At the same time, the preform was held by a single split mold for a bottle having a body outer diameter of about 4.5 cm, a body length of about 9 cm, a neck outer diameter of about 1.6 cm, a neck length of about 1 cm and a kick in the flat bottom to blow up it at a blow-up ratio of about 2.8 with a high-pressure gas, thereby stretching and orienting it in a circumferential direction (transverse direction) to mold a bottle. The high-pressure gas was parison mold (temperature: about 30° C.) at a resin temperature of about 235° C. The resin was taken out of the mold before the resin was solidified, thereby premolding a preform (thickness: about 1.6 mm; outer diameter: about 1.6 cm; length: about 5 cm; spherical bottom surface) formed of a hot parison. A stretching rod was immediately inserted into the hot preform thus obtained to stretch the preform about 2.25 times in a machine direction, thereby orienting it. At the same time, the preform was held by a single split mold for a bottle having a body outer diameter of about 4.5 cm, a body length of about 9 cm, a neck outer diameter of about 1.6 cm, a neck length of about 1 cm and a kick in the flat bottom to blow up it at a blow-up ratio of about 2.8 with a high-pressure gas, thereby stretching and orienting it in a circumferential direction to mold a bottle. The high-pressure gas was further introduced into the bottle to heat set the bottle at 150° C. for 10 seconds. The bottle was taken out of the mold to obtain a stretch blow molded container. The stretch blow molded container thus obtained was transparent.

[EXAMPLE 4]

A stretch blow molded container was produced in the same manner as in Example 3 except that Pellet (No. 2)

prepared in Example 2 was used in place of Pellet (No. 1). The stretch blow molded container thus obtained was transparent.

[Comparative Example 1]

Pellet (No. 1) prepared in Example 1 was charged into a vertical extruder equipped with a parison die having an outer diameter of 1.6 cm and a clearance of 0.7 mm and extruded at a resin temperature of about 235° C. into a molten parison. The parison was held by a single split mold (inverted) for a bottle having a body outer diameter of about 4.5 cm, a body length of about 9 cm, a neck outer diameter of about 1.6 cm, a neck length of about 1 cm and a kick in the flat bottom while maintaining the resin temperature at about 160° C. or higher, and a flat bottom part thereof was pinched off. At the same time, a high-pressure gas was introduced into the parison through a neck part thereof to blow up it into a bottle. The mold was opened to take the bottle out of the mold. The bottle was cooled to obtain a molded bottle the body sidewall of which was substantially not oriented. The bottle thus obtained became opaque due to devitrification upon the cooling.

[Comparative Example 2]

An extrusion blow molded container was produced in the same manner as in Comparative Example 1 except that Pellet (No. 2) prepared in Example 2 was used in place of Pellet (No. 1), and the blow molding temperature was changed to about 150° C. The bottle thus obtained became opaque due to devitrification upon the cooling.

[Comparative Example 3]

Pellet (No. C1) was prepared in the same manner as in Example 1 except that Polymer (P-C1) obtained in Polymer Preparation Example 3 was used, and the resin temperature upon the extrusion was changed to about 190° C. A stretch blow molded container was obtained in the same manner as in Example 1 except that this Pellet (No. C1) was used, and the resin temperature upon the injection of the pellet into the closed-end parison mold and the stretch blow molding temperature were changed to about 190° C. and about 60° C., respectively. The stretch blow molded container thus obtained was transparent.

[Comparative Example 4]

Extrusion blow molding was attempted in the same manner as in Comparative Example 1 except that Pellet (No. C2) was prepared with Polymer (P-C2) obtained in Polymer Preparation Example 4, and this Pellet (No. C2) was used. However, Polymer (P-C2) had a melt viscosity, $\eta^*$ too low as about 300 Pa·s to subject it to the extrusion blow molding, so that the blow molding was obliged to stop due to severe drawdown of the polymer.

[Comparative Example 5]

Pellet (No. C3) was prepared in the same manner as in Example 1 except that Polymer (P-C3) obtained in Polymer Preparation Example 5 was used, and the resin temperature upon the extrusion was changed to about 200° C. A stretch blow molded container was produced in the same manner as in Example 1 except that this Pellet (No. C3) was used, and the resin temperature upon the injection of the pellet into the closed-end parison mold and the temperature of the hot preform were preset to about 200° C. and about 70° C., respectively. However, since the stretch blow molded container obtained from the glycolic acid/lactic acid (weight ratio=50:50) copolymer was poor in heat resistance, gas barrier properties and drop strength.

The results of these Examples and Comparative Examples are shown collectively in Table 2.

TABLE 2

|  |  |  | Example | | | | Comp. Example | | | | |
|---|---|---|---|---|---|---|---|---|---|---|---|
|  |  |  | 1 | 2 | 3 | 4 | 1 | 2 | 3 | 4 | 5 |
| Composition | Polymer | Code | P-1 | P-2 | P-1 | P-2 | P-1 | P-2 | P-C1 | P-C2 | P-C3 |
|  |  | Part by weight | 100 | 100 | 100 | 100 | 100 | 100 | 100 | 100 | 100 |
|  | Additive | Kind | — | DMEP | — | DMEP | — | DMEP | — | — | — |
|  |  | Part by weight | — | 1 | — | 1 | — | 1 | — | — | — |
| Molding conditions | Blow molding process | | Stretch A | Stretch A | Stretch B | Stretch B | Extrusion | Extrusion | Stretch A | Extrusion | Stretch A |
|  | Blow-up ratio (times), TD | | | About 2.8 | | | | About 2.8 | Ab. 2.8 | — | Ab. 2.8 |
|  | Draw ratio (times), MD | | | About 2.25 | | | | — | Ab. 2.25 | — | Ab. 2.25 |
|  | Molding temperature (° C.) | | | 45 | | | 160 | 150 | 60 | — | 70 |
| Physical properties at body sidewall | Tensile strength (MPa) | | 350 | 310 | 270 | 250 | 90 | 90 | 70 | — | 20 |
|  | Tensile modulus (GPa) | | 4.7 | 4.7 | 4.1 | 4.0 | 2.1 | 2.0 | 2.1 | — | 2.0 |
|  | $O_2$ permeability (at 80% RH, 23° C.; cc/m² · day · atm) | | 0.3 | 0.4 | 0.4 | 0.5 | 1.2 | 1.5 | 700 | — | 2,000 |
|  | $CO_2$ permeability (at 80% RH, 23° C.; cc/m² · day · atm) | | 1.6 | 2.0 | 2.1 | 3.0 | 6.0 | 6.0 | 3,500 | — | >10,000 |
|  | Water vapor permeability 90% RH, 40° C.; g/m² · day) | | 3.1 | 3.5 | 3.3 | 3.6 | 9.0 | 10.0 | 200 | — | Partial dissolution |
|  | Heat shrinkage (%) | | <1 | <1 | <1 | <1 | 4 | 4 | 25 | — | Melting down |
| Drop test, breaking | | | None | None | None | None | Broken | Broken | Partly broken | — | Broken |
| Degradability in soil | | | High | High | High | High | High | High | High | — | High |
| Remarks | | | | | | | *1 | *1 | *2 | *3 | *4 |

(Note)
Stretch A: Two-stage injection·stretch blow molding process (cold parison method);

Stretch B: One-stage injection-stretch blow molding process (hot parison method);
Extrusion: Extrusion blow molding process;
*1: Insufficient orientation;
*2: Polylactic acid;
*3: Infeasible molding due to drawdown;
*4: Noncrystalline amorphous substance.

We claim:

1. A stretch blow molded container formed from a thermoplastic resin material which comprises polyglycolic acid having
   (a) a repeating unit represented by the following formula (1):

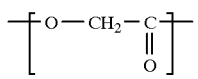

(b) a melt viscosity, η* as measured at a temperature of the melting point, Tm, of the polymer+20° C. and a shear rate of 100/sec, of 500–100,000 Pa·s;
   (c) a melting point, Tm, of at least 180° C.;
   (d) a melt enthalpy, ΔHm, of at least 29 J/g; and
   (e) a density of at least 1.50 g/cm$^3$ as measured in an unoriented, crystallized form,
wherein the proportion of the repeating unit represented by the formula (1) in the polymer is at least 70 weight percent, and wherein the stretch blow molded container has tensile strength, in a circumferential direction, of at least 150 MPa and a carbon dioxide permeability, as measured at a temperature of 23° C. and 80% relative humidity and a thickness of 50 μm, of 300 cc/m$^2$·day·atm or smaller at a body sidewall thereof.

2. The stretch blow molded container according to claim 1, wherein the container is obtained by forming or molding the thermoplastic resin material at a resin temperature of from the melting point, Tm, to 255° C. into a preform, stretching the preform at a draw ratio higher than one time but not higher than 10 times and at a resin temperature equal to or less than the glass transition temperature, Tg, of the polyglycolic acid+70° C. or in a machine direction, simultaneously or successively blowing up the preform at a blow-up ratio of 1.5–10 into a hollow container, and optionally heat setting the thus-obtained hollow container for 1 second to 30 minutes at a temperature ranging from the crystallization temperature, Tc, of the polyglycolic acid to Tm+10° C.

3. The stretch blow molded container according to claim 1, wherein the container is degradable in soil.

4. The stretch blow molded container according to claim 1, wherein the container has an oxygen permeability, as measured at a temperature of 23° C. and 80% relative humidity and a thickness of 50 μm, of 150 cc/m$^2$·day·atm or smaller at the body sidewall thereof.

5. The stretch blow molded container according to claim 1, wherein the container has a water vapor permeability, as measured at a temperature of 40° C. and 90% relative humidity and a thickness of 50 μm, of 100 g/m$^2$·day or smaller at the body sidewall thereof.

6. The stretch blow molded container according to claim 1, wherein the container has a tensile modulus, in a circumferential direction, of at least 3.0 GPa at the body sidewall thereof.

7. The stretch blow molded container according to claim 1, wherein the container has a heat shrinkage, as measured at 130° C. for 10 minutes, of at most 30% at the body sidewall thereof.

8. The stretch blow molded container according to claim 1, wherein the thermoplastic resin material is composed of the polyglycolic acid alone.

9. The stretch blow molded container according to claim 1, wherein the thermoplastic resin material is a composition composed of the polyglycolic acid and at least one component selected from the group consisting of inorganic fillers and thermoplastic resins other than the polyglycolic acid.

10. The stretch blow molded container according to claim 9, wherein the thermoplastic resin material is a composition composed of the polyglycolic acid and at least one component selected from the group consisting of inorganic fillers and thermoplastic resins other than the polyglycolic acid and comprises 100 parts by weight of the polyglycolic acid, 0–100 parts by weight of the inorganic fillers and 0–100 parts by weight of the other thermoplastic resins.

11. The stretch blow molded container according to claim 9, wherein the thermoplastic resin material is a composition comprising 100 parts by weight of the polyglycolic acid and 0.05–30 parts by weight of the plasticizers.

12. The stretch blow molded container according to claim 1, wherein the polyglycolic acid is a homopolymer of glycolide.

13. The stretch blow molded container according to claim 1, wherein the polyglycolic acid is a copolymer of glycolide in a proportion not lower than 70 wt. %, but lower than 100 wt. % and at least one cyclic comonomer selected from the group consisting of ethylene oxalate, lactide, lactones, trimethylene carbonate and 1,3-dioxane in a proportion higher than 0 wt. %, but not higher than 30 wt. %.

14. The stretch blow molded container according to claim 13, wherein the polyglycolic acid is a copolymer of glycolide in a proportion not lower than 70 wt. %, but lower than 100 wt. % and ethylene oxalate.

15. The stretch blow molded container according to claim 13, wherein the polyglycolic acid is a copolymer of glycolide in a proportion not lower than 70 wt. %, but lower than 100 wt. % and lactide.

16. The stretch blow molded container according to claim 1, wherein the container has an internal volume of at least 25 ml.

17. The stretch blow molded container according to claim 1, wherein the thermoplastic resin material further comprises at least one plasticizer.

18. The stretch blow molded container according to claim 17, wherein the thermoplastic resin material is a composition comprising 100 parts by weight of the polyglycolic acid and 0–100 parts by weight of the plasticizer.

* * * * *